MONO-SELECTED MATRIX AND STORAGE ELEMENT THEREFOR

Filed June 12, 1961

INVENTOR
LOUIS A. RUSSELL
BY Melvin P. Williams
AGENT

United States Patent Office 3,213,434
Patented Oct. 19, 1965

3,213,434

MONO-SELECTED MATRIX AND STORAGE ELEMENT THEREFOR

Louis A. Russell, Zurich, Switzerland, assignor to International Business Machines Corporation, New York, N.Y., a corporation of New York Filed June 12, 1961, Ser. No. 116,411
11 Claims. (Cl. 340—174)

Figures 1, 2, 3, 4:
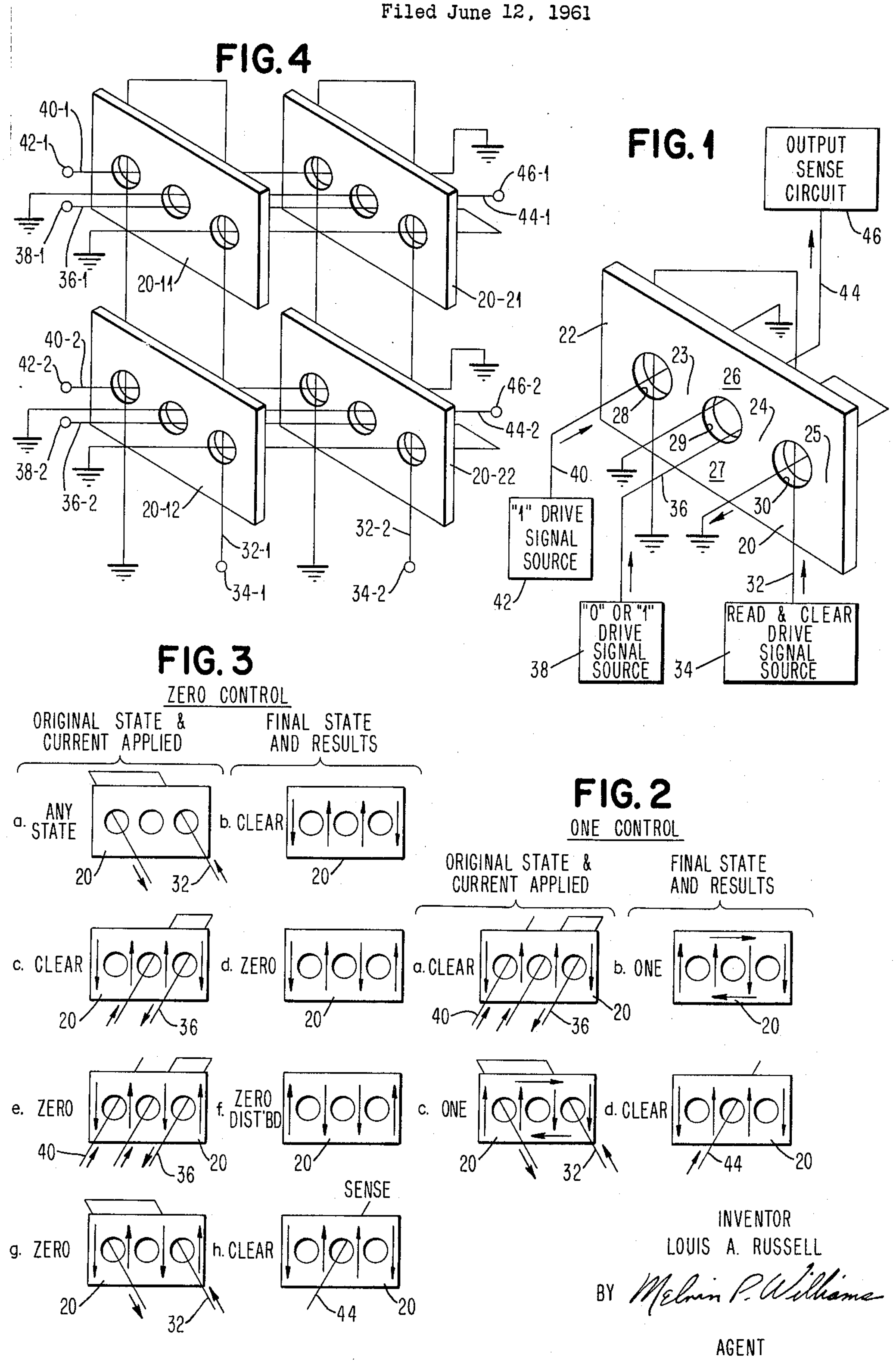

This invention relates to storage devices and, more particularly, to storage arrays of the type utilizing a plurality of multistable storage elements.

Of the many types of storage employed in data processing, one well-known type employs the binary number system, and comprises arrays of discrete storage elements having bistable characteristics, such as magnetic cores, capacitors, and the like. These elements generally are identified within the array as having significance in two or more ways. For instance, in word-oriented storage matrices, the individual storage elements are arranged in a plurality of rows and columns: a column may represent a word, and the data designation represented by the storage elements within the word may be identified by the particular row in which each storage element appears; alternatively, a row may represent a word and the data designations may be represented by the various columns.

In word-oriented data storage matrices utilizing a storage element having at least two stable states, various techniques for entering (or writing) data bits of proper designation into a particular word register have been used. In one technique, signals may be supplied to all of the storage elements in a register in such a manner as to set them to one of two stable states or conditions, which may be identified as representing either a ONE or a ZERO; if instead, the other stable state (representing a ZERO or a ONE, respectively) is desired in selected elements of a register, an inhibiting signal is simultaneously applied to only those selected storage elements. In another technique, signals may be applied to one part of a storage element for setting either a ONE or a ZERO and additional signals may be simultaneously applied to a different part of the storage element so that the two signals together will set the storage element to a ZERO or a ONE, respectively. In each of these techniques, the application of the signal tending to set the storage element to a ONE or a ZERO is made to each storage element in one coordinate (i.e., to each storage element in a word) and a second signal is applied to selected circuits in the opposite coordinate (i.e., to selected bit circuits) in order to selectively cause certain of the storage elements in that word to be set to ZERO or ONE, respectively.

A still different technique is used in conventional toroidal magnetic core storage matrices in which coordinate selection is achieved by means of coincident currents. In the latter, no change in the state of any core will take place in response to only one of the coordinate currents, but a change of state will take place as a result of both coordinate currents being simultaneously applied.

Common to all of these techniques is the application of concurrent signals in two coordinates in order to write specific data into a specific register. The usual method is to apply signals tending to set all of the storage devices in one word register to a ONE, the other word registers receiving no signals in the word coordinate. Simultaneously, the data designation circuits (or bit circuits) in the other coordinate are selectively actuated to cause the correct combination of data to be entered into the selected word register. For instance, in registers using toroidal cores for storage elements, the word winding would provide half of the current necessary to switch the cores (half-select current), and bit windings corresponding to data designations which are to be stored as ONES would supply half-select current to the corresponding toroids. Alternatively, the word winding may supply full-select current, and bit windings corresponding to ZEROS would then supply inhibit current to prevent selected cores from switching to ONE.

In one type of storage matrix previously available, multi-stable storage elements are used in such a manner as to provide stable conditions not only for values of binary ONE and binary ZERO, but also a third state which may be called the READ or CLEAR state of the storage element, from which the element may be switched into either the ONE or ZERO states. When not in the CLEAR state, none of the controlling signals which might otherwise change the storage element into a ONE state or a ZERO state has the effect of setting such state in the storage element. This operation is known to permit setting one of a plurality of storage elements with a single circuit without affecting the recognizable state or setting of other storage elements which are also controlled by that circuit. A known example of a storage element having the third stable state just described comprises a multi-aperture magnetic core. In data storage matrices utilizing the multi-stable storage element having the third state just described, a single signal in one coordinate may switch the storage element from the CLEAR state into one of its other states, for example, a ONE or a ZERO, and simultaneous application of an additional signal in the other coordinate causes the storage element to be switched instead from the CLEAR state to the other stable state, for example, a ZERO or ONE state, respectively. Therefore, the multi-stable storage element matrix has the ability to repetitively apply signals to a given circuit (i.e., a data designating circuit common to a plurality of word registers) without disturbing or changing the state of storage elements which have been previously set to ONE or ZERO, the states of which are desired to be maintained. This permits driving all of the row circuits (or data-designating circuits) simultaneously with only one column circuit (or word register circuit) without changing the states of storage elements in other columns (or other word registers). However, coordinate signals are still required in a word-oriented matrix in order to place the particular information desired into the correct, unique location. That is, the prior art requires word circuit control concurrent with bit circuit control to make the correct combination of ONES and ZEROS in the correct word register.

In certain types of storage devices, the reading out of data may be destructive, leaving a register set in a non-data-designating condition, or indicating only ZEROS. In order to perserve the data destructively read, regeneration of the data, by rewriting it into the same register, is usually performed. Regeneration in prior art devices requires the use of addressing of the same type required for writing original data into the register, and therefore requires addressing circuitry in addition to that needed for reading and writing.

An object of this invention is to provide a storage matrix in which the storing of information therein may be achieved without concurrent coordinate drive signals.

Other objects include:

Reducing the inherent amount of equipment needed in order to write data into a particular position in a storage matrix;

Provision of a storage device which permits addressing data into a storage matrix without multi-coordinate write addressing circuits;

Provision of a storage matrix wherein the addressing for the writing of data may be achieved without concurrent coordinate drive signals;

Elimination of the need for addressing data to a storage device in data regeneration operations.

This invention is predicated on the concept that data storage registers are generally cleared of original data stored therein prior to writing new data into the register. Particularly, in word-oriented registers, the original data in each word is generally erased or cleared just prior to writing a new word of data into any particular word register. In practical storage registers, clearance of each word register prior to writing new data may be required, for instance, because certain storage devices are incapable of storing a ZERO on top of a ONE (or vice versa) without some additional erase or clearance operation. In some devices, the normal reading operation of a register may be non-destructive, and in other devices in which reading is destructive, regeneration of the data following a readout operation (so as to maintain the data stored in the register) is usually performed. Thus, whether it be to clear out data replaced in the register by regeneration, or to clear out data remaining after a non-destructive read-out, an erasing or clearing operation is generally provided prior to a subsequent writing operation.

I have discovered that use of a storage device of the type described hereinbefore (in which data stored therein will not be changed by subsequent attempts to store data therein) together with a word-addressed clearing function, will permit the addressing of data into a data storage matrix using only a bit address.

In accordance with the present invention, a storage device of the type described hereinbefore is utilized in a matrix wherein the writing operation is addressed only to bits, tending to establish data in the like bit of each word register in the entire storage matrix. Word registers which have data already stored therein (either ONES or ZEROS) will not respond to the bit signals, but word registers which have been erased or cleared will respond so as to set each bit thereof to ONE or ZERO in accordance with the various signals forcing the bits.

One feature of this invention is the elimination of circuitry, the clearing operation serving to effect word addressing during a writing operation.

Another feature is that regeneration may be effected without any word addressing whatsoever.

Additionally, since specific word addressing is not required in reading data into a memory, any form of selection may be utilized, the only requirement being that any initially selected word be cleared just prior to the writing of data into the storage device.

An example of a multi-stable storage element having the third state is a multi-apertured magnetic core with appropriate windings. Because of the many advantages, and high degree of development of the magnetic core storage art, I show my invention, by way of example, as embodied in a magnetic core storage apparatus.

In prior multi-aperture magnetic cores arranged with windings to operate as a multi-stable storage device of the type described hereinbefore, it has been shown that a fourth stable state is actually involved. The configuration of drive current windings necessary for provision of the ONE, ZERO and CLEAR states has resulted in the ability of the core, when set to the ONE state, to be switched to another state in response to subsequent application of currents tending to set the core to ZERO. This fourth state has been called the ONE DISTURBED state, and acts as an "alternative one" state. The output winding is so related to the core that switching from ONE or ONE DISTURBED to ZERO will give an output signal of the same polarity. However, the length of path of the flux which is reversed is less for the ONE state than for the ONE DISTURBED state. This means that uniform output signal strength, and optimum predictable operation are not possible. Furthermore, since switching from either the ONE state or the ONE DISTURBED state to the CLEAR state will generate an output signal, the core will be loaded by the output sensing circuit during switching, which means that the current necessary to switch the core will be critical. The amount of current necessary to switch from ONE to CLEAR is less than that needed to switch from ONE DISTURBED to CLEAR, or vice versa. If the source of switching current has an appreciable internal impedance, it may, when loaded, deliver less current than that necessary to switch cores set in the ONE DISTURBED state, yet sufficient current to switch cores from the ONE state, or vice versa.

An object of this invention is to provide an improved multi-stable storage element.

A further object of this invention is to provide a multi-stable storage element having a single data-designating state.

Still another object of this invention is to provide a multi-stable magnetic storage element having an output manifestation which is generated in response to uniform flux changes.

Accordingly, this invention provides a multi-stable storage element having CLEAR, ZERO and ONE states, the operation of which is such as to provide for the fourth state in a manner not affecting the output manifestation, as described hereinafter.

In one embodiment of this novel storage element, a multi-apertured magnetic core is so operated in response to drive current windings as to be switchable from the ONE state to only the CLEAR state, and so as to provide a fourth state which is an alternative to the ZERO state. This may be called, in accordance with the terminology of the art, a ZERO DISTURBED state.

The foregoing and other objects, features and advantages of my invention will be apparent from the following more particular description of a preferred embodiment thereof, as illustrated in the accompanying drawings.

In the drawings:

FIG. 1 is a schematic representation of a multi-aperture core and the control windings arranged thereon in accordance with one embodiment of this invention;

FIG. 2*a* through FIG. 2*d* are schematic representations of the currents applied on the windings of the core shown in FIG. 1, in establishing, maintaining and reading a ONE, and the effects thereof, in accordance with a preferred embodiment of the present invention;

FIG. 3*a* through FIG. 3*h* are schematic representations of the effects of current supplied on the windings to the core illustrated in FIG. 1 in establishing and maintaining a binary value of ZERO, in accordance with a preferred embodiment of the present invention;

FIG. 4 is a schematic diagram of a two-by-two word-oriented storage matrix employing the core and circuitry of FIGS. 1–3, in accordance with one embodiment of the present invention.

In FIG. 1, a core 20 is divided into a plurality of legs 22–27 by three apertures 28–30. A winding 32 passes in a first direction through the aperture 30, and returns in a second direction through the aperture 28. This winding is operative, when conventional current passes in a direction from a READ and CLEAR DRIVE SIGNAL SOURCE 34 to ground, to cause the sensing of a ONE and simultaneously place the core 20 in a cleared state (hereinafter referred to as the CLEAR state). A winding 36 passes in a first direction through the aperture 29, and returns in the opposite direction through the aperture 30. This winding, when carrying conventional current in the direction from a "0" or "1" DRIVE SIGNAL SOURCE 38 to ground, operates to set the core (in a manner to be described hereinafter) so as to represent a binary ZERO. A winding 40 passes in said first direction through the aperture 28, and is operative, when conducting conventional current from a "1" DRIVE SIGNAL SOURCE 42 to ground simultaneously with the passage of current previously described on winding 36, to cause the core to be set in a state representing the binary value ONE. A winding 44 passing through aperture 29 is provided to sense a change in state of the device from the binary value ONE to the clear state as a result of current flowing on winding 32 by providing an output signal voltage to an output sense circuit 46. The operative characteristics of the device shown in FIG. 1 are explained with reference to FIGS. 2 and 3.

In FIG. 2, the operation of the device in establishing, maintaining, and sensing the binary value ONE is shown. FIGS. 2*a* and 2*c* illustrate different original states of the core together with current being applied in order to change the state from that shown therein. FIGS. 2*b* and 2*d* illustrate the final state or setting of the core as a result of the current shown in FIGS. 2*a* and 2*c* (respective), and FIG. 2*d* also illustrates the sense voltage resulting from sensing the ONE in FIG. 2*c*.

FIGS. 3*a*, 3*c*, 3*e* and 3*g* illustrate various original states of the core, and current being applied to change the setting of the core to something other than that shown. FIGS. 3*b*, 3*d*, 3*f* and 3*h* illustrate the setting of the core, resulting from the currents in FIGS. 3*a*, 3*c*, 3*e*, and 3*g* (respectively).

Referring now to FIG. 3*a*, the core 20 is shown with current applied to the READ and CLEAR winding 32. Regardless of what state or condition the core was in prior to the application of current on winding 32, the core will be set to the CLEAR state as shown in FIG. 3*b*. In this state, remanent flux, in an amount sufficient to substantially saturate the various legs, exists as follows: downward in leg 22, upward in leg 23, upward in leg 24, and downward in leg 25. Thus, there is a counterclockwise flux about the aperture 28, and a clockwise flux about the aperture 30. Since there are complementary downward and upward fluxes in the legs 22 and 23, and complementary upward and downward fluxes in the legs 24 and 25, the flux is balanced at either end of the core, and there is no flux in either of the horizontal legs 26, 27. Referring to FIG. 2*a*, the core 20 is shown in the CLEAR state with current applied on winding 40 and on winding 36, the combination of which will set the core to the ONE state, as shown in FIG. 2*b*. In FIG. 2*a*, the current in the winding 36 can be thought of as looping the leg 24, the current being in such a direction as to tend to generate a downward flux in that leg. In order for the flux in the leg 24 to switch from upward to downward, there must be a balancing switch in flux from downward to upward in some other leg. The current on the winding 40 can be thought of as looping the leg 22 in the same manner that current on the winding 36 loops the leg 24. In fact, the effect of the current on the winding 40 is the same as if it looped around the leg 22 and this current, therefore, tends to switch the flux in leg 22 from downward to upward. Thus, the current in winding 40 and the current in winding 36 combine to switch the flux in legs 22 and 24, respectively, of the core 20, but not in the legs 23 and 25. This, therefore, results in an unbalance of the core, the flux in the two right-hand legs 24, 25, being downward, and the flux in the two left-hand legs 22 and 23 being upward. Therefore, there is a net clockwise flux about the core, including flux directed toward the right in the upper horizontal leg 26, and flux directed to the left in the lower horizontal leg 27. The flux in the legs 26, 27 is the characteristic of the ONE state, there being no flux in either horizontal leg in any other condition of the core 20. The setting or state of ONE is not disturbable, as is easily seen by considering the fact that further current applied on the windings 36 and 40, tending to establish a ONE in the core, would find the core substantially saturated in every direction in which these currents tend to orient the flux. Therefore, simultaneous currents on windings 36 and 40 will have no effect on the core when it is already in the ONE condition. Similarly, current applied on winding 36 tends to switch the flux in the leg 24 downward, and since flux is already nearly saturated in the downward direction in leg 24, current tending to establish a ZERO alone will have no effect upon the core when it is set into the ONE state.

The reading of the core 20 is caused by application of current on the winding 32, as shown in FIG. 2*c*. The effect of this current is to tend to establish downward flux in leg 22, upward flux in leg 23, upward flux in leg 24, and downward flux in leg 25 (as described with reference to FIGS. 3*a* and 3*b* hereinbefore). However, since leg 23 is already saturated with upward flux, and leg 25 is already saturated with downward flux, the switching of flux in legs 22 and 24 complement each other so that each will reverse, leaving the core in the CLEAR state as shown in FIG. 2*d*. As a result of the switching of flux in legs 22 and 24, the core will be restored to a balanced condition; that is, the two left-hand legs 22, 23 have complementary downward and upward fluxes therein, and the two right-hand legs 24, 25 have complementary upward and downward fluxes in them also. Thus, there is no longer a net clockwise flux about the entire core 20, and the saturation flux in the two horizontal legs 26, 27 can no longer be sustained. Therefore, there is a change in flux in the horizontal legs, the change being from a remanent flux (to the right in the upper leg 26, and to the left in the lower leg 27) to substantially no flux in each horizontal leg. As a result of this, the sense winding 44 has a voltage induced therein as can be seen by considering the sense winding to be wrapped around either one of the horizontal legs 26, 27. For instance, of the winding 44 was considered to be wrapped around the upper horizontal leg 26, the change in flux (not the flux itself) would be from right to left in the leg 26. This would (according to Lenz's law and the regular right-hand rule for conventional current) induce a voltage tending to cause current to flow through aperture 29 on winding 44 in the direction from bottom to top, or left to right, as shown in FIG. 2*d*. Similarly, considering the winding 44 to be wrapped around the lower horizontal leg 27, the change in flux therein is from left to right which change would induce a voltage of the same polarity: that is, tending to cause current to flow from left to right or bottom to top on the winding 44 through the aperture 29 as shown in FIG. 2*d*.

Referring again to FIG. 3, the various settings of the core are similar to those just described with respect to FIG. 2, except for an additional stable state of the core called ZERO DISTURBED, shown in FIG. 3*f*. The setting of the core into the ZERO state is illustrated with reference to FIG. 3*c*. There, current is applied to the core 20 in the CLEAR state on winding 36, as before, but no current is applied on the winding 40 (which therefore is not shown in FIG. 3*c*). As a result of this current, the upward flux in leg 24 tends to be changed to a downward flux. In order to do this, an additional leg must have the direction of its remanent flux changed from downward to upward. Since leg 23 is already saturated upward, only legs 22 and 25 can possibly switch. Inasmuch as leg 22 is a greater distance away from leg 24, leg 25 will tend to switch more readily than leg 22. This is due to the fact that the reluctance of a path including both leg 24 and leg 22 is greater than the reluctance of a path including legs 24 and 25, so that the leg 25 will experience a threshold value of coercive force more readily than will leg 22. The ability of the core to switch leg 25 in preference to switching leg 22 is essential, and is discussed more fully hereinafter. The ZERO state of the core is accomplished by reversing legs 24 and 25, as shown in FIG. 3*d*.

The ability of this device to remain insensitive to further attempts at changing the state of the core, when the core is set in either the ONE or ZERO state, has hereinbefore been demonstrated with respect to the ONE state. In that state, the core remains set precisely as it was before, uneffected by further attempts to set the core to either ONE or ZERO. FIG. 3*e* shows the ZERO state of the core and current being simultaneously applied to windings 36 and 40 after the core is set to ZERO. As described hereinbefore, the leg 24 is saturated as a result of the current on winding 36 when the ZERO is set. Thus, further attempts to saturate leg 24 downward will have no effect on the core. However, since in establishing the ZERO state of the core, no current is applied on winding 40, the leg 22 is not saturated upward. Therefore, leg 22 tries to respond to the current on winding 40 by reversing its saturation direction from downward to upward, and in order to do so, there must be a corresponding change in one of the other legs of the core. Since leg 24 is already saturated in a downward direction, it cannot assist leg 22. This means that either leg 23 or leg 25 must switch in order to support the reversing of flux in leg 22. As described hereinbefore with respect to setting the ZERO state, the closer leg will experience a threshold amount of magnetic field more readily than will the leg farther away from the driving current, due to the reluctance of the path. Therefore, it is the leg 23 which will switch from upward to downward in order to support the switching of leg 22 from downward to upward. This results in the ZERO DISTURBED state shown in FIG. 3*f*. Note that in this state, there is a clockwise flux about the aperture 28 and a counterclockwise flux about the aperture 30. This means that the right-hand two legs 24, 25 contain complementing flux, and the left-hand two legs 22, 23 contain complementing flux. Therefore, there is no net flux in either of the horizontal legs 26, 27, which flux was described hereinbefore as being the sole recognition of the ONE state of the core. There are, therefore, essentially two "zero states," one being the ZERO state and the other being the ZERO DISTURBED state. These have in common the fact that there is no net flux in either of the horizontal legs 26, 27. The ability of the core to favor switching of leg 25 over the switching of leg 22 when setting a ZERO, and to favor the switching of leg 23 over the switching of leg 25 when setting a ZERO DISTURBED is due to the length of flux path between the various legs. This ability is enhanced in a core made of material having a hysteresis loop which demonstrates a pronounced threshold characteristic for irreversible flux changes. That is, the knees of the hysteresis loop ought to be very sharp, and the saturation inductance of the material must be very low, which is illustrated in a hysteresis loop having very flat top and bottom lines. Thus, as the magnetic field increases in the core, there is essentially no change in flux within the core until the coercive force reaches a critical value. When the field reaches a strength in excess of a critical value, it results in changing the direction of saturation flux from one direction to another in that particular part of the core.

In order to read a ZERO, the core is supplied a current on line 32 as shown in FIG. 3*g*, which current restores the core to the CLEAR state shown in FIG. 3*h*. However, since the net effect of the current on line 32 is to reverse the flux around the aperture 30 from counterclockwise to clockwise, there is no change in flux in either of the horizontal legs 26, 27.

Considering the ZERO DISTURBED state shown in FIG. 3*f*, with current applied to the winding 32 as shown in FIG. 3*g*, the net effect would be to reverse the flux around the aperture 30 from counterclockwise to clockwise (as it does in reading and clearing the ZERO state) and to simultaneously reverse the flux around the aperture 28 from clockwise to counterclockwise. Neither of these reversals affect the flux in either of the horizontal legs 26, 27 since the core remains balanced (that is, there is complementary flux on either end of the core).

In the foregoing description, the ZERO state is discussed as representing a data designation equal to the binary value "0." The CLEAR state is discussed as being a non-data-designating condition from which the core may be switched to the ONE or ZERO states. However, since an output is generated only in the process of switching from ONE to CLEAR, the device cannot distinguish between the CLEAR, ZERO and ZERO DISTURBED states. Further, since only the ONE state creates a recognized output manifestation, it is the only state actually utilized to designate data. Therefore, in terms of actual operating characteristics, the CLEAR state can be thought of as a "ready" or "cocked" state, from which the core can be switched to the ONE state, and the ZERO and ZERO DISTURBED states can be thought of as "Unresponsive" or "Blocked" states, from which the core cannot be switched into the ONE state. Similarly, the ONE state can be thought of as a "latched" state, since the core will not switch from ONE to ZERO or ZERO DISTURBED. A preferred embodiment of a storage matrix, discussed hereinafter, is possible because of the selective response of the core to circuit signals, as just described.

*Matrix control*

FIG. 4 illustrates the utilization of the device of FIGS. 1–3, in accordance with one embodiment of this invention, in a two-by-two matrix containing two "words" of two "bits" each. The nomenclature in FIG. 4 has been chosen to retain the numeral identification of the elements described with respect to FIGS. 1–3, with the inclusion of additional numerals after hyphens in order to describe the position within the matrix of each of the elements used. The drive signal sources 34, 38, 42 and output sense circuit 46 are shown schematically in the form of terminals, in order to simplify FIG. 4. Specifically, FIG. 4 comprises a word-oriented matrix having the cores 20–11 and 20–12 in the WORD 1 register, core 20–11 being identified with BIT 1 and core 20–12 being identified with BIT 2. Similarly, cores 20–21 and 20–22 correspond to BIT 1 and BIT 2 of the WORD 2 register, respectively. In the upper left-hand side of FIG. 4 is shown a first bit winding 36–1 which is operative to set either core 20–11 or 20–21 to ZERO or to assist in setting either of these cores to a ONE as hereinbefore described. Similarly, a winding 40–1 is capable of assisting the winding 36–1 in setting a ONE in either of the cores 20–11 or 20–21. The sensing of a ONE in either core 20–11, 20–21 will cause a current to appear on a BIT 1 sense winding 44–1. Similar windings are supplied to the core 20–12, 20–22 which correspond to BIT 2 within the matrix. A read and clear winding 32–1 passes through cores 20–12 and 20–11 and is effective to read out and/or reset or clear the WORD 1 register. Similarly, the read and clear winding 32–2 passes through cores 20–22 and 20–21 and is effective to read out and/or clear these two cores, which comprise the WORD 2 register.

In describing the operation, assume that the configuration of FIG. 4 comprises cores having no saturation flux in them whatsoever. Thereafter, if a ONE is to be set in the BIT 1 cores 20–11, 20–21, current is applied on winding 36–1 and 40–1, as described hereinbefore with respect to FIG. 2*a*. This leaves the cores set in the ONE state as illustrated in FIG. 2*b*. Similarly, assume that a ZERO is to be stored in either of the cores 20–12 or 20–22. Current is applied on winding 36–2 causing the cores to be set, in the manner described with respect to FIG. 3*c*, to the ZERO state shown in FIG. 3*d*. If thereafter, the establishment of the value "11" were to be stored in the WORD 2 register, this register would first be cleared by application of current on winding 32–2, as described with reference to FIG. 3*a*, leaving cores 20–21 and 20–22 in the CLEAR state shown in FIG. 3*b*. Thereafter, a ONE would be stored in core 20–21 by application of current on line 36–1 and 40–1 and a ONE would be stored in core 20–22 by application of current on windings 36–2 and 40–2. This would establish the ONE state shown in FIG. 2*d* in each of these cores. The effect of the current on windings 36–1, 40–1, 36–2 and 40–2 on the WORD 1 register cores 20–11 and 20–12 would be nil, as described hereinbefore. That is, core 20–11 already being saturated in the ONE state, current tending to set this core to the ONE would have no effect thereon. Additionally, since core 20–12 is set to the ZERO state, current applied on windings 36–2 and 40–2 in the manner described with reference to FIG. 3*e* would cause core 20–12 to be switched into the ZERO DISTURBED state shown in FIG. 3*f*. Thus, it is possible to limit the effect of bit windings threading through each of the word registers to only word registers which have been initially placed in the CLEAR state; the current in any of the bit windings is not effective upon cores already saturated in either the ZERO or ONE state.

In the usual register, whether the readout is destructive or not, a clearing operation is usually required just prior to entering data into a given word register. Therefore, application of current on windings 34–1 or 34–2 in order to clear the WORD 1 or WORD 2 register, respectively, is a normal operation which is usually performed, and utilizing this clearance for word register selection does not represent an additional operation to be performed on the matrix. Further, in a destructive readout type of storage, of which the present embodiment is one, the necessity to retain stored data for furture use requires that the storage apparatus be provided with data-regeneration devices. Data regeneration is a well-known operation which provides for the re-writing into any given word register the data which has been destructively read-out of that register. In the usual device, not only is addressing of the word register required during read out and read-in, but it is also required for a writing operation during the regeneration of data following a destructive readout. In devices embodying my invention, readout, itself, clears the word register being read so as to establish that particular register as the next register to receive data being written into the matrix. Thereore, the reading operation itself addresses the regeneration of data back into the same word register.

In summation, utilization of the multi-apertured core in the manner described permits writing on bit windings to tend to establish in any core associated with that bit winding a ONE or ZERO state, and the effect of current on that bit winding will be felt only in a core which has been placed in the CLEAR state. The CLEAR state of cores in a given word register is effected by destructively reading out, or (if readout is followed by regeneration) by a clearance operation which is similar to a destructive reading out. This eliminates the need for programming the word address in order to effect regeneration of data in a destructively readout word register.

If, in reading out a word register, an exceptionally large current were to appear on a sense winding, it could switch other cores threaded by the same sense winding from ZERO to ONE. A smaller current could switch other cores from ZERO DISTURBED to ZERO, which of course is immaterial to the operation of the device. One of the advantages of my invention is that the voltage induced as an output signal is inherently small, so excessive currents do not flow in the sense windings, and outputs from one core will not switch other cores in an undersizeable manner.

Due to the last described characteristic, and other inherent characteristics, there are no critical factors, such as current levels, in the operation of the device. The core is easily made, and though the best operation is achieved with a most pronounced threshold characteristic, the operation will be satisfactory with materials exhibiting lower thresholds. A preferred shape for a core comprises legs 22–25 of equal cross section, and legs 26 and 27 each having a cross section equal to twice that of legs 22–25. The exact ratio, however, is not critical.

This invention has been described in terms of word-oriented storage matrices for clarity of understanding only; any storage arrangement having individual storage locations (i.e., the storage elements herein) with dual significance (i.e., the words and data designations or bits herein) may obtain the beneficial use of this invention.

Although only a two-by-two matrix is disclosed, it should be clear that much larger matrices may employ the inventive concepts contained herein. Furthermore, this invention permits matrices larger than those presently obtainable, since the loading effect of non-responding elements is less, the power previously required for the various addressing functions is saved, and the complexity of the address-determining circuitry is greatly reduced.

The storage element used in the illustrative embodiment is a multi-aperture ferrite core, but could be any element having a latched ONE (or data designating) state, a CLEAR (or cocked) state, and one or more uncocked (or blocked) states, as before described, or even the type of element known in the prior art as having alternative ONE state.

While my invention has been particularly shown and described with reference to a preferred embodiment thereof, it will be understood by those skilled in the art that the foregoing and other changes and variations in form and details may be made therein without departing from the spirit and scope of the invention.

I claim:

1. A memory apparatus, comprising:

a plurality of data registers, each data register including a plurality of storage elements, each element in each data register being associated in a group with like elements in all other data registers, each storage element having a non-data-designating condition from which it can be switched into either one of two data-designating states, alternatively, each element being switchable from either data-designating state to said non-data-designating condition, but not from either of said data-designating states to the other, each element developing an output manifestation when switched from a first one of said data-designating states to said non-data-designating condition;

a plurality of sensing means, one for each element in one of said data registers, each responsive to each element in all of said data registers to sense an output manifestation of any of said data registers;

a plurality of selectively operable control means, one for each of said data registers, each for setting all of the elements in the respectively corresponding register to said non-data-designating condition;

and a plurality of element setting means, each one uniquely corresponding to a related group of elements, each operative, by selectively switching one of the respectively corresponding elements into either one of said data-designating states, alternatively, to store data in one of said registers in combination with all other ones of said setting means.

2. A memory apparatus, comprising:

a plurality of data registers, each data register including a plurality of storage elements, each element in each data register being associated with a like element in all other data registers, each storage element having a non-data-designating condition from which it may be switched into either one of two data-designating states, alternatively, each element being switchable from either data-designating state to said non-data-designating condition, but not from either of said data-designating states to the other, each element developing an output manifestation when switched from a first one of said data-designating states to said non-data-designating condition;

a plurality of sensing means, one for each element in one of said data registers, each responsive to each element in all of said data registers to sense an output manifestation of any of said data registers;

a plurality of selectively operable control means, one for each of said data registers, each for setting all of the elements in the respectively corresponding register to said non-data-designating condition;

a plurality of selectively operable first element setting means, one for each element in one of said registers;

and a plurality of selectively operable second element setting means, one for each of said first element setting means, the operation of one of said first element setting means switching any of the respectively corresponding element from said non-data-designating condition to a first one of said states, and the concurrent operation of a second one of said element setting means simultaneously with the corresponding first element setting means switching any of said respectively corresponding elements to the second one of said states.

3. A memory apparatus, comprising:

a plurality of data registers, each data register including a plurality of storage elements, each element in each data register being associated with a like element in all other data registers in an element group, each storage element having a first condition from which it may be switched into either a data generating state or a blocked state, alternatively, each element being switchable from either of said states to said first condition, but not from either of said states to the other, each element developing an output manifestation when switched from said data generating state to said first condition;

a plurality of sensing means, one for each element in one of said data registers, each responsive to each element in all of said data registers to sense an output manifestation of any of said data registers;

a plurality of selectively operable control means, one for each of said data registers, each for setting all of the elements in the respectively corresponding register to said first condition;

and a plurality of element setting means, one uniquely corresponding to each element group, each operative, by selectively switching one of the respectively corresponding elements into either one of said states, to store data in one of said registers in combination with all other ones of said setting means.

4. A memory apparatus, comprising:

a plurality of data registers, each data register including a plurality of storage elements, one or more elements in each data register each being associated with a like element in one or more other data registers, each storage element having a first condition from which it may be switched into either one of two stable states, alternatively, each element being switchable from either stable state to said first condition, but not from either of said stable states to the other, each element developing an output manifestation when switched from a first one of said stable states to said first condition;

a plurality of element setting means, each corresponding to a particular storage element in each of a plurality of said data registers, each connected in like manner to all of the respectively corresponding storage elements, each selectively operable to switch the related storage elements from said first condition to one or the other of said states, alternatively;

a plurality of selectively operable control means, one for each of said data registers, each connected in like manner to all of the storage elements in the respectively corresponding data register, each operable to set all of the related storage elements into said first condition;

and a plurality of sensing means, each respectively corresponding to one of said element setting means, each commonly responsive to the switching from said first state to said first condition of any of the respectively corresponding storage elements to sense an output manifestation.

5. A memory apparatus, comprising:

a plurality of data registers, each data register including a plurality of storage elements, one or more elements in each data register each being associated with a like element in one or more other data registers, each storage element having a first condition fnom which it may be switched into either a data generating state or a blocked state, alternatively, each element being switchable from either of said states to said first condition, but not from either of said states to the other, each element developing an output manifestation only when switched from said data generating state to said first condition;

a plurality of element setting means, each corresponding to a particular storage element in each of a plurality of said data registers, each connected in like manner to all of the respectively corresponding storage elements, each selectively operable to switch the related storage elements from said first condition to one or the other of said states, alternatively;

a plurality of selectively operable control means, one for each of said data registers, each connected in like manner to all of the storage elements in the respectively corresponding data register, each operable to set all of the related storage elements into said first condition;

and a plurality of sensing means, each respectively corresponding to one of said element setting means, each commonly responsive to the switching from said data generating state to said first condition of any of the respectively corresponding storage elements to sense an output manifestation.

6. A memory apparatus, comprising:

a plurality of data registers, each data register including a plurality of storage elements, one or more elements in each data register each being associated with a like element in one or more other data registers, each storage element having a first condition from which it may be switched into either one of two stable states, alternatively, each element being switchable from either stable state to said first condition, but not from either of said stable states to the other, each element developing an output manifestation when switched from a first one of said stable states to said first condition;

a first setting means for switching all of the elements in said data storage apparatus out of said first condition;

a plurality of selectively operable second setting means, each corresponding to a particular storage element in each of a plurality of said data registers, each connected in like manner to all of the respectively corresponding storage elements, each selectively operable in conjunction with simultaneous operation of said first setting means to switch the related storage elements from said first condition to said first state, each element responsive to said first setting means to switch from said first condition to the other one of said states whenever the respectively corresponding one of said second setting means is not operated concurrently;

a plurality of selectively operable control means, one for each of said data registers, each connected in like manner to all of the storage elements in the respectively corresponding data register, each operable to set all of the related storage elements into said first condition;

and a plurality of sensing means, each respectively corresponding to one of said second setting means, each commonly responsive to the switching from said first state to said first condition of any of the respectively corresponding storage elements to sense an output manifestation.

7. A memory apparatus, comprising:

a plurality of data registers, each data register including a plurality of storage elements, one or more elements in each data register each being associated with a like element in one or more other data registers, each storage element having a first condition from which it may be switched into either a data-generating state or a blocked state, alternatively, each element being switchable from either state to said first condition, but not from either of said states to the other, each element developing an output manifestation only when switched from said data-generating state to said first condition;

a first setting means for switching all of the elements in said data storage apparatus from said first condition to said blocked state;

a plurality of selectively operable second setting means, each corresponding to a particular storage element in each of a plurality of said data registers, each connected in like manner to all of the respectively corresponding storage elements, each selectively operable to switch the related storage elements from said first condition to said data-generating state in conjunction with simultaneous operation of said first setting means, each element responsive to said first setting means to switch from said first condition to said blocked state whenever the respectively corresponding one of said second setting means is not operated concurrently;

a plurality of selectively operable control means, one for each of said data registers, each connected in like manner to all of the storage elements in the respectively corresponding data register, each operable to set all of the related storage elements into said first condition;

and a plurality of sensing means, each respectively corresponding to one of said second setting means, each commonly responsive to the switching from said first state to said first condition of any of the respectively corresponding storage elements to sense an output manifestation.

8. A magnetic storage device, comprising:

a plurality of magnetic cores, each core being provided with three apertures of approximately the same size in a straight line longitudinally thereof, said apertures providing first, second, third and fourth transverse legs, and first and second longitudinal legs, said cores being arranged in columns and rows to form an orthogonal matrix;

a plurality of means for establishing a cleared state of said cores, said cleared state consisting, in each core, of a downward saturation flux in said first transverse leg, and upward saturation flux in said second and third transverse legs, and a downward saturation flux in said fourth transverse leg, there being one of said means for each column in said matrix;

setting means for reversing the flux in said third transverse leg from upward to downward, and for concurrently reversing the flux in said fourth transverse leg from downward to upward in all cores in said matrix;

a plurality of selectively operable means, one for each of said rows, each effective in combination with said setting means when operated simultaneously therewith to reverse the flux in said third transverse leg from upward to downward and to concurrently reverse the flux in said first transverse leg from downward to upward, whereby flux is oriented in said first longitudinal leg in a direction from said first transverse leg to said fourth transverse leg, and flux is simultaneously oriented in said second longitudinal leg in a direction from said fourth transverse leg to said first transverse leg, in each of the respectively corresponding cores;

and a plurality of means, one for each of said rows, each responsive to flux in either of said longitudinal legs for sensing the concurrent operation of said setting means and said selectively operable means in any of the respectively corresponding cores.

9. A data storage apparatus of the type utilizing a plurality of magnetic storage elements in which driving currents may be selectively applied to windings, associated therewith, consisting of:

a plurality of ferrite cores arranged in an orthogonal matrix in columns and rows, each core having three apertures therethrough, one at each end of each core and a central one between them, said apertures dividing each core into four transverse legs and two longitudinal legs;

a plurality of selectively operable column driving means, one for each of said columns, each for passing current through a first end aperture in a first one of two directions and through a second end aperture in the opposite direction in each of the cores within the respectively corresponding column;

a plurality of first driving means, one for each of said rows, each for passing current through the central aperture in said first direction and through said first end aperture in said opposite direction in each core within the respectively corresponding row;

a plurality of selectively operable driving means, one for each of said first driving means, each for passing current only through said second end aperture in said first direction in each core within the respectively corresponding row;

and a plurality of sense windings, one for each row, each passing through said center aperture in each core of the respectively corresponding row.

10. A magnetic storage device, comprising:

a ferromagnetic core provided with three apertures of approximately the same size in a straight line longitudinally thereof, said apertures providing first, second, third and fourth transverse legs, said first and fourth legs being at opposite ends of said core, and first and second longitudinal legs;

means for establishing a cleared state of said core, said cleared state consisting of a downward saturation flux in said first transverse leg, an upward saturation flux in said second and third transverse legs, and a downward saturation flux in said fourth transverse leg;

first means for reversing the flux in said third transverse leg from upward to downward, and for concurrently reversing the flux in said fourth transverse leg from downward to upward;

second means including said first means for simultaneously reversing the flux in said third transverse leg from upward to downward and reversing the flux in said first transverse leg from downward to upward, whereby flux is oriented in said first longitudinal leg in a direction from said first transverse leg to said fourth transverse leg, and flux is simultaneously oriented in said second longitudinal leg in a direction from said fourth transverse leg to said first transverse leg;

and means responsive to flux in either of said longitudinal legs for sensing the concurrent operation of said first and second means.

11. A magnetic storage device of the type in which driving currents may be selectively applied to windings, consisting of:

a ferromagnetic core, said core having three apertures therethrough, one at each end of said core and a central one between them, said apertures dividing said core into four transverse legs and two longitudinal legs;

means for passing current through a first end aperture in a first one of two directions and through a second end aperture in the opposite direction;

means for passing current through the central aperture in said first direction and through said first end aperture in said opposite direction;

means for passing current only through said second end aperture in said first direction;

and sense winding means passing through said center aperture.

References Cited by the Examiner

UNITED STATES PATENTS

| | | | |
|---|---|---|---|
| 3,023,400 | 2/62 | Booth | 340—174 |
| 3,126,530 | 3/64 | Post | 340—174 |

IRVING L. SRAGOW, *Primary Examiner.*

BERNARD KONICK, *Examiner.*